United States Patent [19]
Hui

[11] Patent Number: 5,528,725
[45] Date of Patent: Jun. 18, 1996

[54] METHOD AND APPARATUS FOR RECOGNIZING SPEECH BY USING WAVELET TRANSFORM AND TRANSIENT RESPONSE THEREFROM

[75] Inventor: Siew K. Hui, Singapore, Singapore

[73] Assignee: Creative Technology Limited, Singapore, Singapore

[21] Appl. No.: 148,985

[22] Filed: Nov. 8, 1993

[30] Foreign Application Priority Data

Nov. 13, 1992 [GB] United Kingdom .................. 9223791

[51] Int. Cl.$^6$ ...................................... G10L 5/06
[52] U.S. Cl. ........................ 395/245; 395/2.31; 395/2.57
[58] Field of Search .............................. 395/22.45, 2.31, 395/2.42, 2.12, 2.57

[56] References Cited

U.S. PATENT DOCUMENTS

| | | | |
|---|---|---|---|
| Re. 33,597 | 5/1991 | Levinson et al. ........................ | 381/43 |
| 4,370,521 | 1/1983 | Johnston et al. ...................... | 395/2.45 |
| 4,790,017 | 12/1988 | Hiaton ..................................... | 381/43 |
| 4,815,134 | 3/1989 | Picone et al. ........................... | 395/2.31 |
| 4,905,288 | 2/1990 | Gerson et al. ......................... | 395/2.54 |
| 4,989,248 | 1/1991 | Schalk et al. .............................. | 381/42 |
| 5,014,134 | 5/1991 | Lawton et al. ........................ | 358/261.3 |
| 5,384,725 | 1/1995 | Coifman et al. ........................ | 364/807 |

OTHER PUBLICATIONS

Synthesis/Coding of Audio Signals Using Optimized Wavelets Sinha et al IEEE 23–26 Mar. 1992.
High-Fidelity Audio Compression: Fractional-Band Wavelets Heegard et al IEEE 23–26 Mar. 1992.
Detection of a Transient Signal of Unknown Scaling and Arrival Time Using the Discrete Wavelet Transform Frisch et al IEEE/May 1991.
Detection of Transients Using Discrete Wavelet Transform Petropulu IEEE/Mar. 1992.
A Neural Net Acoustic Phonetic Feature Extractor Based on Wavelets Davenport et al IEEE/May 1991.

*Primary Examiner*—Allen R. MacDonald
*Assistant Examiner*—Richemond Dorvil
*Attorney, Agent, or Firm*—Merchant, Gould, Smith, Edell, Welter & Schmidt

[57] ABSTRACT

The present invention implements a method of automatic speech recognition in a personal computer environment and in real time. The invention uses a wavelet transformer to decompose digitized input speech templates into coefficients assigned to fundamental building blocks, from which the original speech function can be reconstructed. In the preferred embodiment of the present invention, an energy vector comprising seven wavelet coefficients can represent adequately any input speech utterance. The wavelet transformer reduces greatly the number of Input speech samples needed for storage in the computer memory. Computational economy is further achieved when the present invention quantizes the plurality of energy vectors into two binary bits with reference to a predetermined parameter. In the present invention, the predetermined parameter is established as the mean of the energy vector. At the same time, the transient response of the energy vectors are also obtained. With the transient response, the present invention aligns the input speech templates with that of the reference templates in the library without having to time wrap the time axis of the respective templates. The present invention checks if the distance between the transient response of a test template and that of a reference template exceeds a predetermined threshold.

7 Claims, 12 Drawing Sheets

| | | | | | | | |
|---|---|---|---|---|---|---|---|
| 3 | 0 | 0 | 0 | 0 | 0 | 0 | 2 |
| 3 | 0 | 0 | 0 | 0 | 0 | 0 | 2 |
| 3 | 0 | 0 | 0 | 0 | 0 | 0 | 2 |
| 3 | 0 | 0 | 0 | 0 | 0 | 0 | 3 |
| 3 | 0 | 0 | 0 | 0 | 0 | 0 | 3 |
| 3 | 0 | 0 | 0 | 0 | 0 | 0 | 3 |
| 3 | 0 | 0 | 0 | 0 | 0 | 0 | 3 |
| 3 | 0 | 0 | 0 | 0 | 0 | 0 | 2 |
| 3 | 2 | 0 | 0 | 0 | 0 | 0 | 1 |
| 3 | 3 | 0 | 0 | 0 | 3 | 0 | 0 |
| 0 | 0 | 0 | 0 | 0 | 3 | 0 | 0 |
| 0 | 0 | 0 | 0 | 0 | 3 | 0 | 0 |
| 0 | 0 | 0 | 0 | 3 | 3 | 0 | 0 |
| 0 | 0 | 0 | 0 | 3 | 2 | 0 | 0 |
| 0 | 0 | 0 | 3 | 3 | 0 | 0 | 0 |
| 0 | 1 | 0 | 3 | 2 | 0 | 0 | 0 |
| 3 | 3 | 0 | 3 | 0 | 0 | 0 | 1 |
| 3 | 3 | 0 | 1 | 0 | 0 | 0 | 1 |
| 3 | 3 | 0 | 0 | 0 | 0 | 0 | 1 |
| 3 | 3 | 0 | 0 | 0 | 0 | 0 | 1 |
| 3 | 3 | 0 | 0 | 0 | 0 | 0 | 1 |
| 3 | 0 | 0 | 0 | 0 | 0 | 0 | 2 |
| 3 | 0 | 0 | 0 | 0 | 0 | 0 | 3 |
| 3 | 0 | 0 | 0 | 0 | 0 | 0 | 3 |
| 3 | 0 | 0 | 0 | 0 | 0 | 0 | 3 |
| 3 | 0 | 0 | 0 | 0 | 0 | 0 | 3 |
| 3 | 0 | 0 | 0 | 0 | 0 | 0 | 3 |
| 3 | 0 | 0 | 0 | 0 | 0 | 0 | 3 |
| 3 | 0 | 0 | 0 | 0 | 0 | 0 | 3 |
| 3 | 0 | 0 | 0 | 0 | 0 | 0 | 2 |
| 3 | 0 | 0 | 0 | 0 | 0 | 0 | 1 |
| 3 | 0 | 0 | 0 | 0 | 0 | 0 | 1 |
| 3 | 0 | 0 | 0 | 0 | 0 | 0 | 0 |

FIG. 6A

METHOD AND APPARATUS FOR RECOGNIZING SPEECH BY USING WAVELET TRANSFORM AND TRANSIENT RESPONSE THEREFROM

FIELD OF THE INVENTION

The present invention relates to the field of speech processing. In particular, it pertains to a method and apparatus for recognizing speech automatically in a computer environment. By speech, the present invention refers to sound or acoustic patterns uttered by human beings.

BACKGROUND TO THE INVENTION

In the art of automatic speech recognition, two approaches are commonly used for recognizing isolated words. Dynamic time warping. (DTW) matches an unknown input utterance with a library of stored spectral patterns or templates using a procedure that dynamically alters the time dimension to minimize the accumulated distance score for each template. As a result, variation in taking rate is desensitized. See, F. Itakura, "Minimum Prediction Residual Principle Applied to Speech Recognition," *IEEE Transactions on Acoustics, Speech, and Signal Processing*, Vol. ASSP-23, No. 1, February 1975, pp. 66–72. On the other hand, the hidden Markov model (HMM) approach characterizes speech as a plurality of statistical chains. HMM creates a statistical, finite-state Markov chain for each vocabulary word while it trains the data. It then computes the probability of generating the state sequence for each vocabulary word. The word with the highest accumulated probability is selected as the correct identification. Under HMM time alignment is obtained indirectly through the sequence of states. See, S. E. Levinson, L. R. Rabiner, and M. M. Sondhi, "An Introduction to the Application of the Theory of Probabilistic Functions of a Markov Process to Automatic Speech Recognition," *The Bell System Technical Journal*, Vol. 62, No. 4, April 1983, pp. 1035–1074.

The front ends of the DTW and HMM approaches are similar: an unknown spoken utterance is converted into digital representation via analogue-to-digital converter, and the result is analyzed using either linear predictive coding (LPC) or filter banks to extract its spectral features. See, J. D. Markel and A. H. Gray Jr., *Linear Prediction of Speech*, (Springer-Verlag: New York, 1976). Also see, "Speech Processing", *AT & T Technical Journal*, Vol. 65, No. 5, Sep./Oct. 1986. The features can be classified into a finite set of templates, using vector quantization. The templates are then compared to a library or stored set of vocabulary templates to determine the closest match. This set of stored vocabulary templates are predetermined from measurements on speech data. The unknown input is then identified as the closest matching vocabulary entry. If the computer or machine does not find a close enough match, it can announce this result by either sounding a alarm or its synthetic voice.

The performance of speech recognizers depends on the design parameters selected, vocabulary nature and size, and acoustic environment. In general, a conventional DTW does slightly better than one of a HMM design. However, speech recognizers of DTW design is computationally intensive. Although a technique called pruning is used to reduce the computational requirement of DTW speech recognizers, it computational requirements are far too high to be implemented in a personal computer based (PC) system.

SUMMARY OF THE INVENTION

The present invention implements a method of automatic speech recognition in a personal computer environment and in real time. The invention uses a wavelet transform means to decompose digitized input speech templates into coefficients assigned to fundamental building blocks, from which the original speech function can be reconstructed. In general, a plurality of the wavelet coefficients represents speech signals in time, scale and frequency domains. In the preferred embodiment of the present invention, an energy vector comprising seven such coefficients can represent adequately any input speech utterance. The wavelet transform means reduces greatly the number of input speech samples needed for storage in the computer memory. A profile of the input speech utterance is then constructed by accumulating the energy vectors in unit of blocks called templates. Computational economy is further achieved when the present invention quantizes the plurality of energy vectors into two binary bits with reference to a predetermined parameter. In the preferred embodiment of the present invention, the predetermined parameter is established as the mean of the energy vector. At the same time, the transient response of the energy vectors are also obtained. The transient response is the difference in the magnitude of an energy vector and that of the adjoining block. With the transient response, the present invention aligns the input speech templates with that of the reference templates in the library without having to time wrap the time axis of the respective templates. The present invention checks if the distance between the transient response of a test template and that of a reference template exceeds a predetermined threshold. If the threshold is exceeded, then there is no matching. It follows that the computational intensive checking of the sound map of the reference templates is minimized.

BRIEF DESCRIPTION OF THE DRAWINGS

FIG. 6A is a chart showing the quantized map for the word "six" in accordance with FIGS. 4 and 5.

Figure 1:
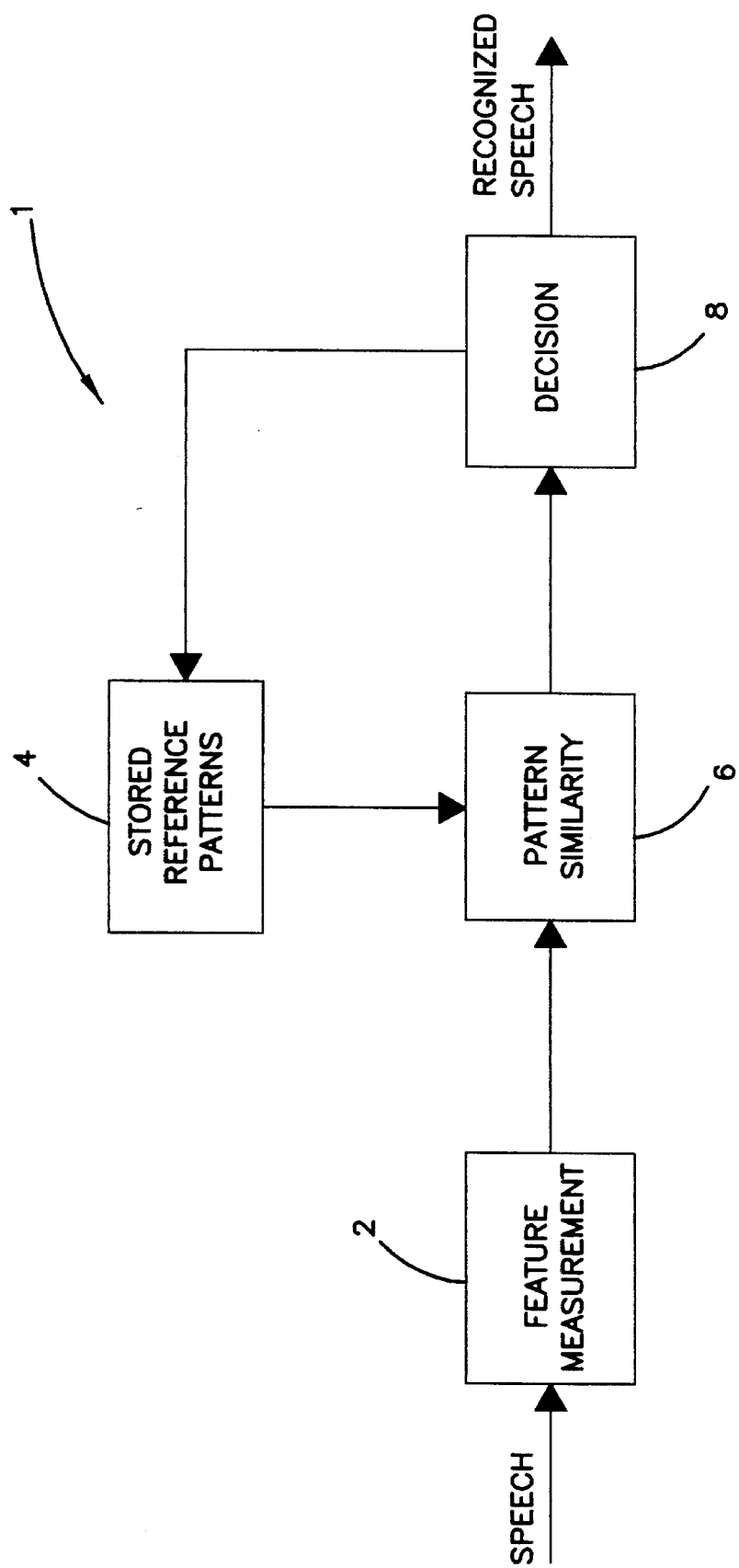
FIG. 1 is a block diagram illustrating a general system for automatic speech recognition.

A method and apparatus for recognizing speech automatically in a computer environment is described. In the following description, numerous specific details are set forth such as bit pattern and program steps, etc. in order to provide a thorough understanding of the present invention. It will be obvious to one skilled in the art that the present invention may be practised without these specific details. In other instances, well-known parts such as those involved with the A/D converter and filters are not shown in order not to obscure the present invention.

DESCRIPTION OF THE PREFERRED EMBODIMENT

Notation and Nomenclature

The detailed description with respect to the wavelet transform as well as the derivation of the energy vectors and transient response of the present invention are presented partially in terms of algorithm and symbolic representation upon operation on data bits within the computer memory. These algorithmic descriptions and representations are the means used by those skilled in the art in the data processing arts to most effectively convey the substance of their work to others skilled in the art.

An algorithm is here, and generally, conceived to be a self-consistent sequence of steps leading to a desired result. These steps are those require physical manipulation of physical quantities. Usually, though not necessarily, these quantities take the form of electrical or magnetic signals capable of being stored, transferred, combined, and otherwise manipulated. In this case, the physical quantities are voltage signals which correspond to the speech signals. It proves convenient at times, principally for reason of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities.

Further, the manipulations performed are often referred to in terms such as adding or comparing, which are commonly associated with the mental operations performed by a human operator. No such capability of a human operator is necessary, or desirable. In most cases, in any of the operations described herein which form part of the present invention; the operations are machine operations. Useful machines for performing the operations of the present invention include general purpose digital computers or similar devices such as digital signal processors. In all cases, it should be borne in mind that there is a distinction between the method operation in operating a computer and the method of computation itself. The present invention relates to method steps for operating a computer in processing speech signals to generate other desired physical signals.

The present invention also relates to an apparatus for performing these operations. This apparatus may be specially constructed for the required purpose or it may comprise a general purpose computer as selectively activated or reconfigured by a computer program stores in the computer. The algorithms presented herein are not inherently related to any particular computer or other apparatus. In particular, various general purpose machines may be used with programs written in accordance with the teachings herein, or it may prove more convenient to construct specialized apparatus such as digital signal processor to perform the required method steps. The required structure for a variety of these machines would appear from the description given below.

General System Configuration

FIG. 1 and system 1 is a block diagram showing a general system for automatic speech recognition based on pattern recognition. The Input speech can be a single word to a phrase of continuous speech. Hereinafter the present invention shall refer to unknown input word or phrase of continuous speech generically as "speech". Typically, a feature measurement block 2 receives the input speech and analyzes it spectrally and periodically to produce a plurality of spectral feature vectors. These vectors characterize the input speech's behaviour. As mentioned earlier, practitioners skilled in the art have used linear predictive coding and filter bank analysis for representing the input speech spectrally. See, J. D. Markel and A. H. Gray Jr., *Linear Prediction of Speech*, (Springer-Verlag: New York, 1976). Also see, "Speech Processing", *AT & T Technical Journal*, Vol. 65, No. 5, Sep./Oct. 1986. The time sequence of these spectral features is called a template.

Referring again to FIG. 1, a set of stored reference templates shown in block 4. It should be understood by one skilled in the art that the test templates and the reference templates are analyzed spectrally in the identical manner. In the template similarity step 6, the running set of test templates is compared with a set of stored reference templates from block 4. Here, a distance or similarity score is produced for each comparison. The template similarity measurement typically involves time registration of the stored referenced template with the running speech. A technique known as dynamic time wrapping (DTW) to provide the optimal alignment between the references and test templates. See, F. Itakura, "Minimum Prediction Residual Principle Applied to Speech Recognition," *IEEE Transactions on Acoustics, Speech, and Signal Processing*, Vol. ASSP-23, No. 1, February 1975, pp. 66–72. Meaningful events in any two templates in the form of peaks in the waveform rarely occur at the same time. To align the time axis of the test and reference templates, the DTW procedure shrinks or elongate the time axis of one template until it optimally matches the other template.

Recently a probabilistic matching procedure called hidden Markov model (HMM) is used as an alternative to using templates to characterize words or speech. HMM determines the likelihood that a given template correspond to a given speech template from the stored reference templates. See, S. E. Levinson, L. R. Rabiner, and M. M. Sondhi, "An Introduction to the Application of the Theory of Probabilistic Functions of a Markov Process to Automatic Speech Recognition," *The Bell System Technical Journal*, Vol. 62, No. 4, April 1983, pp. 1035–1074.

In FIG. 1, the decision step 8 chooses the word or sentence that has the smallest distance or similarity score to the input speech as the recognized speech. If, however, the similarity score does not meet a minimum threshold, the automatic speech recognition system 1 shall indicate or announce a mismatch or an error.

In general, a conventional DTW does slightly better than one of a HMM design. However, speech recognizers of DTW design is computationally intensive. Although a technique called pruning is used to reduce the computational requirement of DTW speech recognizers, it computational requirements are far too high to be implemented in economical, reliable and real-time hardware, such as a personal computer system. The introduction of new generations of digital signal processors has permit practitioners skilled in the art to experiment with ever complex and computationally intensive procedures and algorithms. The present invention implements an automatic speech recognition system which simplifies each of the blocks in the speech recognition system 1 in order to reduce the storage requirements of the reference templates and to minimize the computational effort of the template matching step. These improvements not only permits an automatic speech recognition system to be implemented on a personal computer in real time, but also achieve a superior speech recognition performance.

Figure 2:
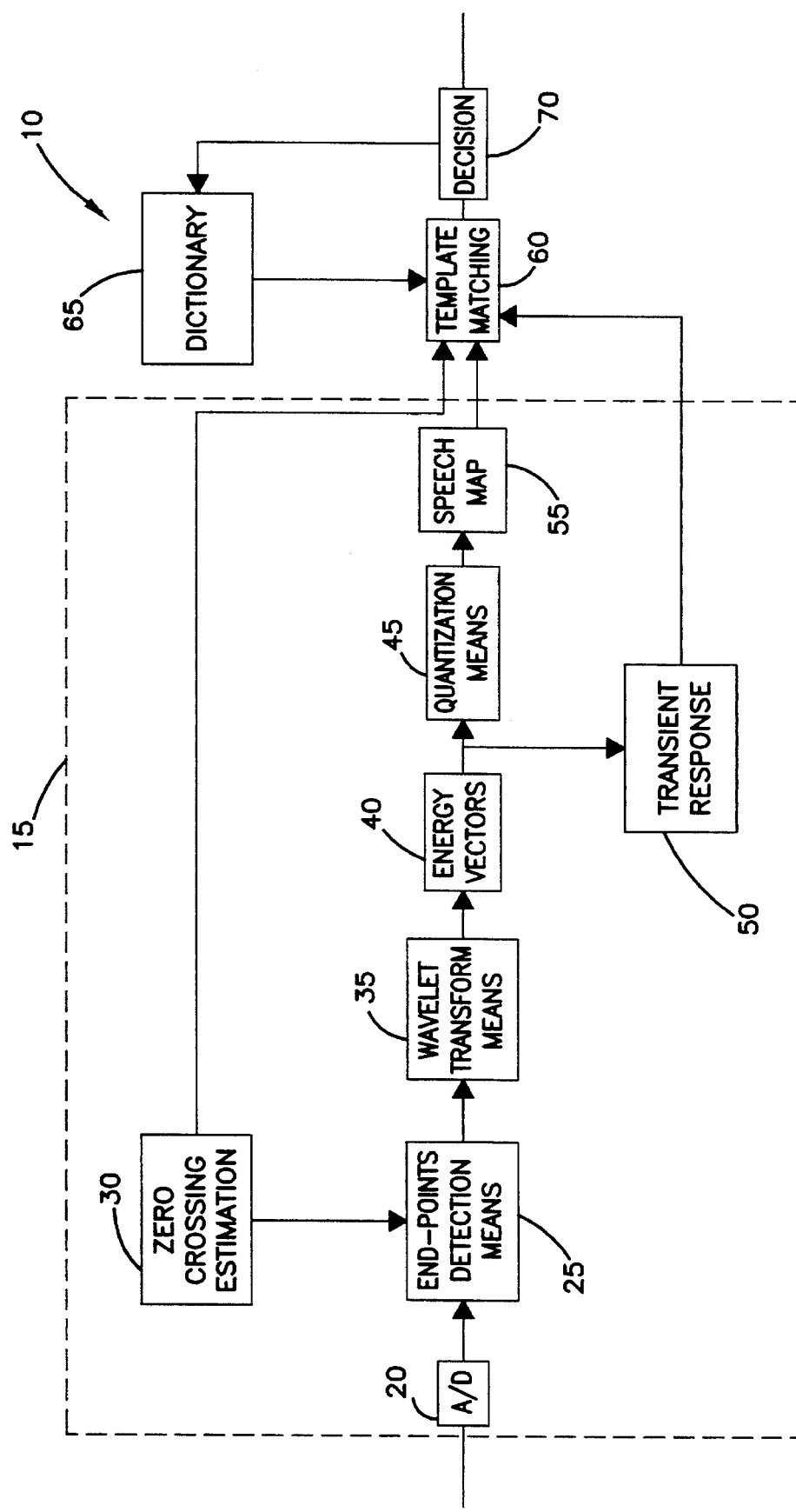
FIG. 2 is a block diagram illustrating the system for automatic speech recognition in the present invention.

FIG. 2 is a block diagram illustrating the automatic speech recognition system 10 used in the present invention. The system 10 comprises a feature extraction means 15, a template matching means 60, a dictionary 65, and a speech recognition decision step 70. Just as the feature measurement step 2 in FIG. 1, the feature extraction means 15 receives the input speech and analyzes it spectrally and periodically to produce a plurality of spectral feature vectors. These vectors characterize the input speech's behaviour. The feature extraction means 15 further comprises an analogue-to-digital (A/D) converter 20, an endpoint detection means 25, a zero crossing estimation means 30, a wavelet transforming means 35, an energy vector forming means 40, a quantizing means 45, a transient response producing means 50, and a speech map 55.

Referring again to FIG. 2, the A/D converter 20 receives input speech and converters it into digital signals of the Input speech in preparation for spectral analysis thereof. The A/D converter 20 is coupled to the endpoint detection means 25 for determining the presence of speech in a background of noise. It should be understood by one skilled in the art that the input speech comprises not only speech but also background noise and other signals including silence. Typically, the input speech waveform from the output of the A/D converter 20 is filtered prior to being sampled at 10 kHz by a bandpass filter (not shown) with a 100-Hz low frequency cutoff and a 4000-Hz high-frequency cutoff and having 48 dB per octave skirts. See, L. R. Rabiner and M. R. Sambur, "An Algorithm for Determining the Endpoints of Isolated Utterances," *The Bell System Technical Journal*, Vol. 54, No. 2, February 1975, pg. 306.

The endpoint detection means 25 in FIG. 2 detects the beginning and end of an utterance accurately by measuring two parameters—the short-time speech energy E(N) and zero crossing rate. The short-time speech energy is defined as the sum of the magnitudes of 10 ms of speech centered on the measurement interval:

$$E(N) = \Sigma |s(N+i)| \quad (1)$$

where s(N+i) are the speech samples and it is assumed that the sampling frequency is 10 kHz and N is the interval unit.

The zero crossing rate of speech, z(N), is defined as the number of zero crossings per 10-ms interval. See, L. R. Rabiner and M. R. Sambur, "An Algorithm for Determining the Endpoints of Isolated Utterances," *The Bell System Technical Journal*, Vol. 54, No. 2, February 1975, pg. 305. The endpoint detection means 25 measures the average and standard deviation of the average short-time energy, E(N), and zero crossing rate, z(N). If any of these measurements are excessive, the endpoint detection means 25 will stop. Otherwise, a zero crossing threshold, IZCT, for the unvoiced speech is chosen. IZCT is defined as follows:

$$IZCT = MIN(IF, IZC + 2\sigma_{IZC}) \quad (2)$$

where IF is defined as 25 crossings per 10 ms; IZC is the zero crossing rate during silence; and σ is the standard deviation.

Referring again to FIG. 2, the endpoint detection means 25 computes the energy function E(N) for the entire interval. The peak energy, IMX, and the silence energy, IMN, are used to set two thresholds, ITL and ITU, according to the following rules:

$$I_1 = 0.03*(IMX - IMN) + IMN \quad (3)$$

$$I_2 = 4*IMN \quad (4)$$

$$ITL = MIN(I1, I2) \quad (5)$$

$$ITU = 5*ITL \quad (6)$$

Figure 3:
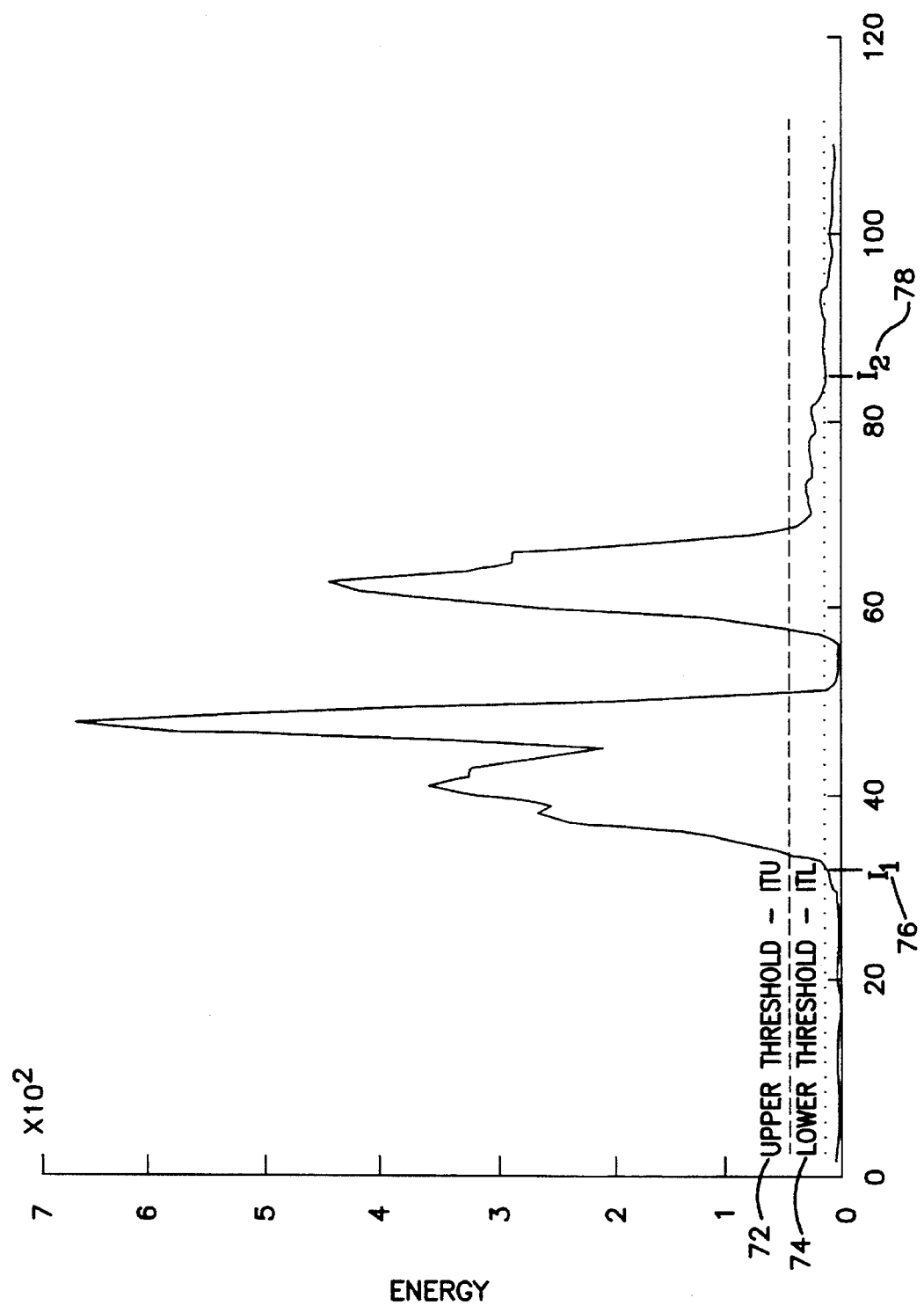
FIG. 3 is a chart showing the speech energy of the word "six" in the preferred embodiment of the present invention.

$I_1$ and $I_2$ are two conservative energy thresholds upon which the ITL and ITU are based. See equations in See, L. R. Rabiner and M. R. Sambur, "An Algorithm for Determining the Endpoints of Isolated Utterances," *The Bell System Technical Journal*, Vol. 54. No. 2, February 1975, pg. 308. FIG. 3 is a chart showing the energy function of a word "six". On the y-axis of FIG. 3 is the short-time speech energy E(N) according to equation (1) above, and the x-axis corresponds to block intervals measured in N units. Thresholds 72 and 74 are ITU and ITL respectively and are illustrated as two horizontal lines in parallel with the x-axis of FIG. 3. The intersections of the energy plot of "six" with and the ITL 74, $I_1$ 76 and $I_2$ 78, represent the first guess at the endpoints locations of this particular utterance of the word "six." Utterance begin endpoint 76 and end endpoint 78 correspond to the intersections between the energy plot and the ITL 74.

Figure 4:
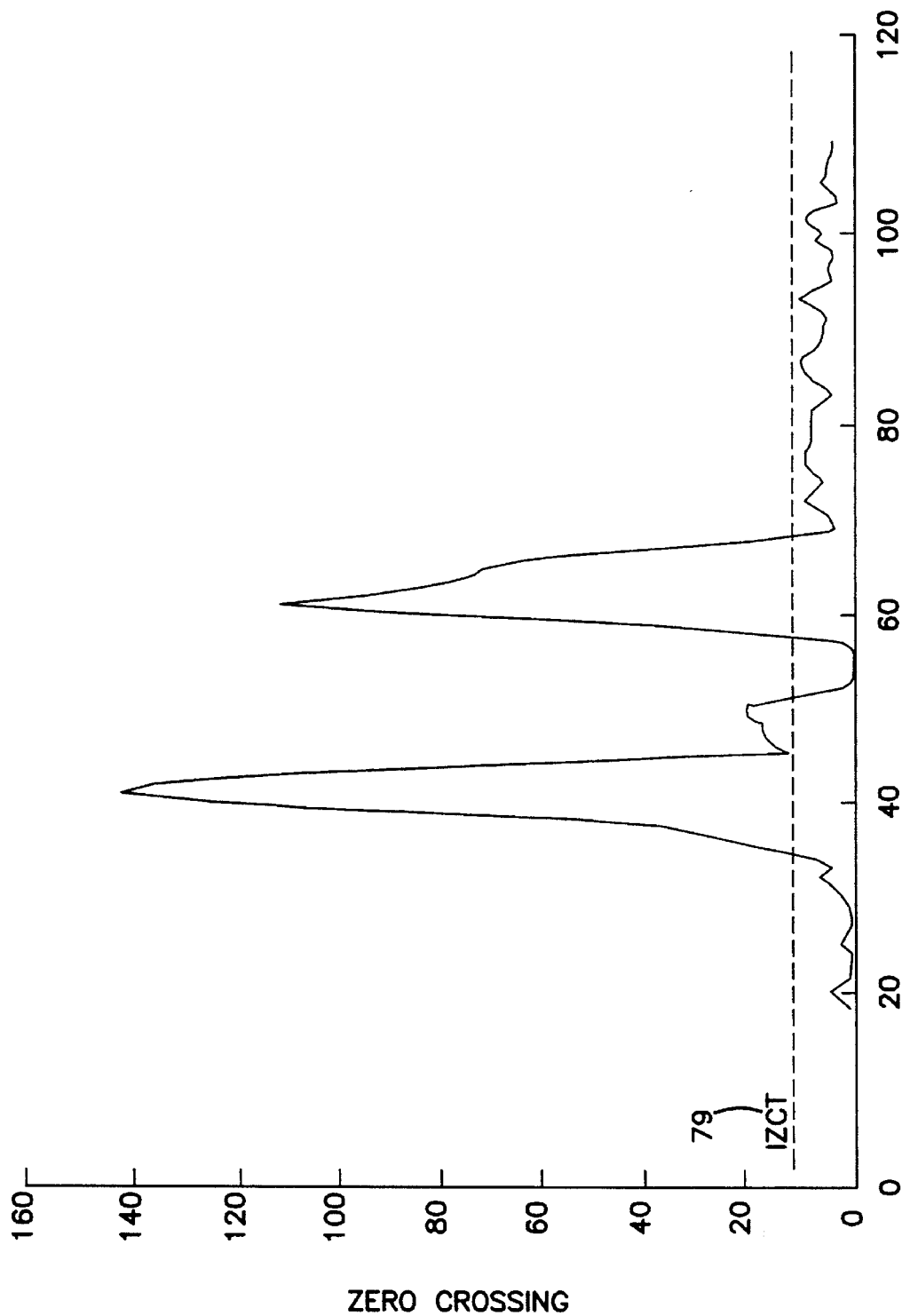
FIG. 4 is a chart showing the zero crossing data of the word "six" in the preferred embodiment of the present invention.

In FIG. 2, the A/D converter 20 is also coupled to the zero crossing estimation means 30 for finetuning the endpoints determined by the endpoint detection means 25. While the endpoint detection means 25 isolates the broad region in which the speech was located by using very conservative thresholds, ITU and ITL, to get a good first guess at the endpoints of the utterance; the zero crossing estimation means 30 provides better estimates of the existence of unvoiced speech energy in a broad on either side of the initial endpoints by measuring the zero crossing rate IZC of the waveform outside of the initial estimates of the endpoints. The zero crossing estimating means 30 examines the intervals 250-ms before the begin endpoint and 250-ms after the end endpoint respectively. If the number of intervals the zero crossing rate exceeding the unvoiced speech threshold, IZCT, by three; the starting point Is set back to the first point in time at which the threshold was exceeded. See, L. R. Rabiner and M. R. Sambur, "An Algorithm for Determining the Endpoints of Isolated Utterances," *The Bell System Technical Journal*, Vol. 54, No. 2, February 1975, pg. 310. FIG. 4 is a chart showing the zero crossings for the word "six". A zero crossing threshold 79 is shown in dotted line which is parallel with the x-axis of the chart in FIG. 4.

In FIG. 2 the wavelet transform means 35 is coupled to the endpoint detection means 25 for decomposing output signals therefrom into a plurality of vectors, said vectors representing the time, scale and frequency domains of said the speech signals. Wavelet transform decomposes functions—in this case a signal function, s(i)—into coefficients assigned to fundamental building blocks, from which the original function can be reconstructed. Wavelet transform relies on the translations and dilations of a "mother wavelet". The mother wavelet can be any function. The rest of the building blocks are formed by translating the mother wavelet by unit steps and by contracting or dilating it by factors of 2. See, B. A. Carpa, "Wavelet Theory Sets Out the Welcome Mat," *SIAM News*, September 1990, pg. 8–9.

Figure 5:
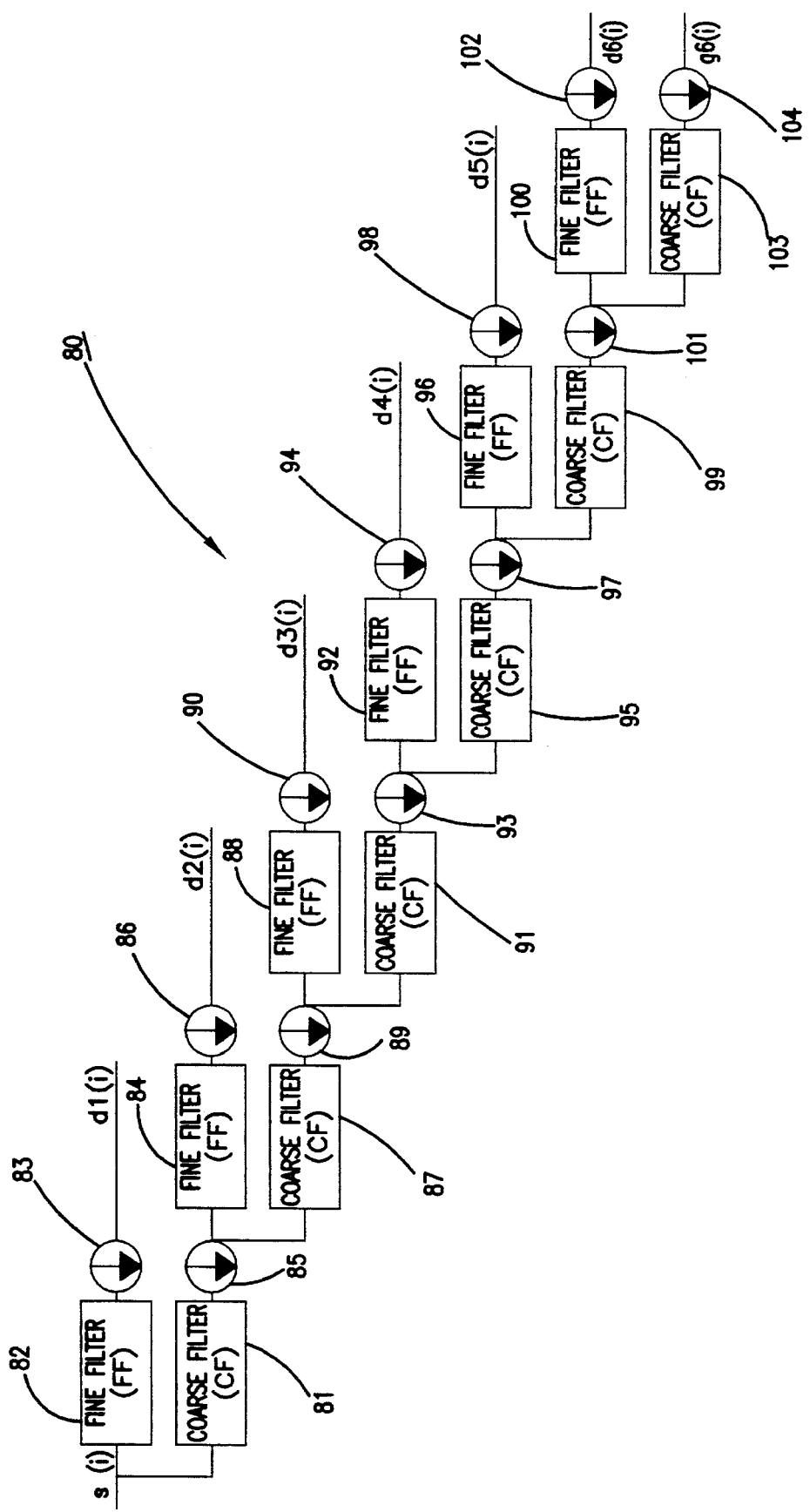
FIG. 5 is a circuit diagram implementing the wavelet transforming means in the preferred embodiment of the present invention.

FIG. 5 is a circuit 80 implementing the wavelet transform means 35 used in the preferred embodiment of the present invention. The circuit 80 comprises a tree structure with a plurality of fine filters 82, 84, 88, 92, 96, and 100, and a plurality of coarse filters 81, 87, 91, 95, 99, and 103. A plurality of down samplers 83, 85, 86, 89, 90, 93, 94, 97, 98, 101, 102 and 104 are also coupled in a cascading manner between the fine filters and coarse filters for reducing proportionally the input samples by a predetermined ratio. In the preferred embodiment of the present invention, this ratio is 2:1 as it implements the wavelet transforming means. The fine filters can be high pass filters and the coarse filter low pass filters. The circuit 80 receives the output from the endpoint detection means 25 and commences to decompose it. The output from the endpoint detection means is a series of digital signals in basic unit of blocks. Each block corresponds to a unit of time. A speech detected over a given number of blocks is called a template. In the preferred embodiment of the present invention, the wavelet transforming means 35 samples the output from the endpoint detection means in overlapping block fashion. In other words, after the first block is sampled by the fine filter 82, the fine filter 84 samples the second half of the first block and the first half of the second block. In this case, the output from the endpoint detection means 25 is the speech signal function, s (i). In the preferred embodiment of the present invention, the circuit 80 produces a plurality of outputs $d_1(i)$, $d_2(i)$, $d_3(i)$, $d_4(i)$, $d_5(i)$, $d_6(i)$, and $g_6(i)$ representing the coefficients of a speech signal function s (i), Each of the coefficients are obtained by taking an order to the power of two fewer samples of the speech signal function s (i). Note that only the outputs from the fine filters are needed for the reconstruction of the original function. It follows a substantial reduction in the number of samples of the input speech are required. The natural consequence of using a wavelet transform means 35 is the saving in computer memory space needed for storing the fewer samples. Moreover, the wavelet transform function consists of a series of division operations. Since the division is to the power of 2, the wavelet transforming function can be carried out in a straight forward and highly efficient manner. For example, if the output from the endpoint detection means 25 has 256 samples over a particular time intervals, the output d from the fine filter 82 has 128 samples over the same time intervals.

Referring again to FIGS. 2 and 5, the next step after the wavelet transform means 35 is the energy vector forming step 40. As mentioned above, the original function s (i) can be reconstructed by forming a vector with the coefficients $d_1(i)$ to $d_6(i)$ and $g_6(i)$ obtained from the wavelet transform means 35. The coefficients of the vector EI, $D_1$ to $D_7$, are related to the outputs from the wavelet transforming means 35, $d_1(i)$ to $d_6(i)$ and $g_6(i)$, in the following manner:

$$D_1 = 1/128 \sum_{i=1}^{128} d_1(i) * d_1(i) \text{ where the overlap is } 64$$

$$D_2 = 1/64 \sum_{i=1}^{64} d_2(i) * d_2(i) \text{ where the overlap is } 32$$

$$D_3 = 1/32 \sum_{i=1}^{32} d_3(i) * d_3(i) \text{ where the overlap is } 16$$

$$D_4 = 1/16 \sum_{i=1}^{16} d_4(i) * d_4(i) \text{ where the overlap is } 8$$

$$D_5 = 1/8 \sum_{i=1}^{8} d_5(i) * d_5(i) \text{ where the overlap is } 4$$

$$D_6 = 1/4 \sum_{i=1}^{4} d_6(i) * d_6(i) \text{ where the overlap is } 2$$

$$D_7 = 1/4 \sum_{i=1}^{4} g_6(i) * g_6(i) \text{ where the overlap is } 2$$

In the preferred embodiment of the present invention, seven level of decomposition has been found to meet acceptable speech recognition requirements. Accordingly, the energy vector $E_i$ has the following values from the circuit 80 in FIG. 5:

$$E_i = \begin{bmatrix} D_1 \\ D_2 \\ D_3 \\ D_4 \\ D_5 \\ D_6 \\ D_7 \end{bmatrix}$$

where i denotes the ith block.

In FIG. 2, the quantizing step 45 follows after the derivation of the energy vector $E_i$. The quantizing step 45 quantizes the energy vector in accordance to the following procedure:

if $D \geq 1.5*EM_i$, then $D_1=3$ or else if $EM_i \geq D < 1.5*EM_i$, then $D_1=2$ or else if $0.5*EM_i \geq D < EM_i$, then $D_1=1$ or else if $D < 0.5*EM_i$, then $D_1=0$ where $EM_i$ is the mean of the ith energy vector, i.e., $EM_{i=(D1}+D_2+D_3+D_4+D_5+D_6+D_7)/7$ The above quantizing procedure is repeated for the remaining coefficients, namely $D_2$, $D_3$, $D_4$, $D_5$, $D_6$ and $D_7$ for each ith block. Consequently, a new quantized vector $EQ_i$ is obtained. The ith block of $EQ_i$ is as follows:

$$EQ_i = \begin{bmatrix} D_{q1} \\ D_{q2} \\ D_{q3} \\ D_{q4} \\ D_{q5} \\ D_{q6} \\ D_{q7} \end{bmatrix}$$

FIG. 6A is a chart showing the quantized map for the word "six" in accordance with FIG. 4. Although the plurality of quantized vectors $EQ_i$ are represented in single digits from 0 to 3 for the ease of presentation, the quantizing step 45 quantizes all coefficients into two binary digits. This choice not only minimizes the computer memory space needed to store the vector information, but also permits the straight forward and quick comparison of the test templates with the reference templates from the dictionary 65.

Figure 6B:
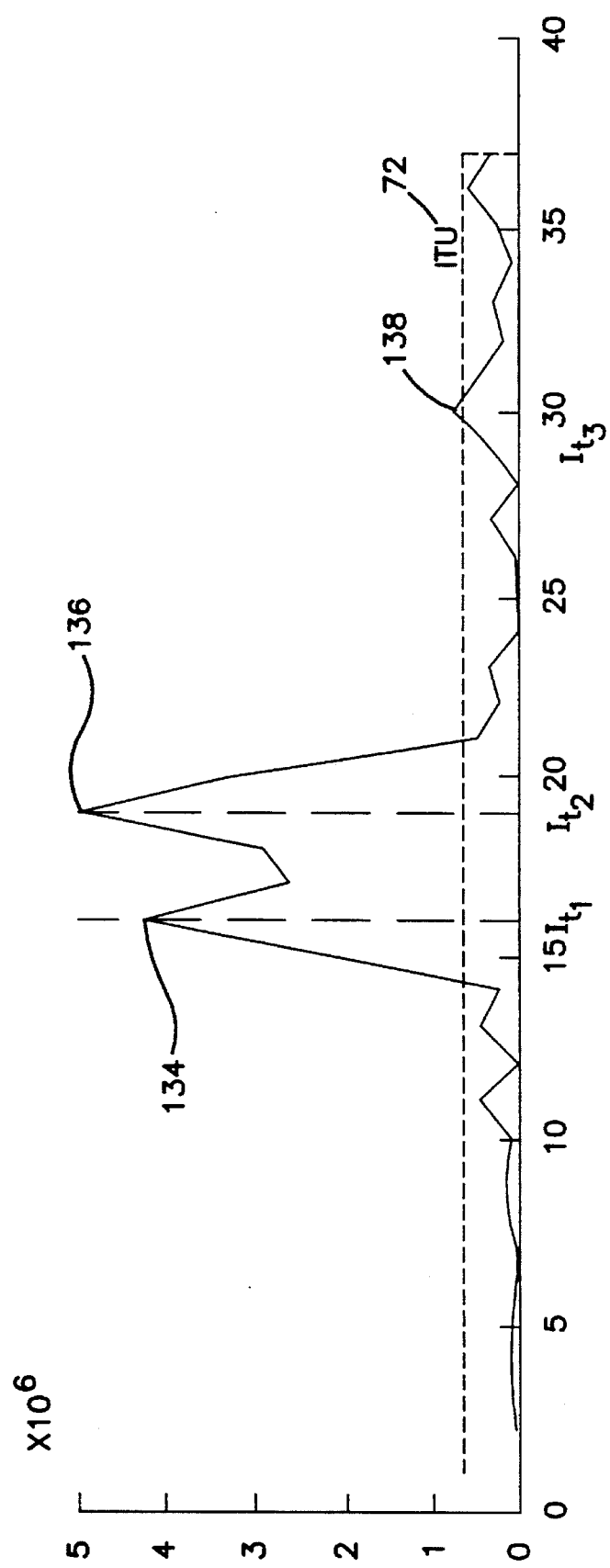
FIG. 6B is another chart showing the transient response of a test template for the word "six" in accordance with FIG. 3.

At the same time the energy vector $EM_i$ is quantized in the quantizing step 45, the transient response of the energy vector $EM_i$ is determined in the transient producing step 50. Here a plurality of transient response of the energy vectors are derived by taking the difference in the amplitude of an energy vector of a, block and that of the adjoining block. FIG. 6B is another chart showing the transient response for the word "six" in accordance with FIG. 4. Acoustically, the transient response of the energy vectors is equivalent to the change in the inflection of a person's vocal chord, i.e., the beginning of the utterance of a syllable or part of a word. In the preferred embodiment of the present invention, the transient response allows the template comparison or the template matching step to be accomplished in real time without having to align the time axis of the test template and the reference template. Moreover, the transient response serves as a threshold where by the template matching step 60 can eliminate as many obviously dissimilar reference templates as possible before the actual sound maps of the remaining templates has to be compared. As such, the present Invention recognizes speech automatically in real time in a personal computer environment.

Figure 6C:
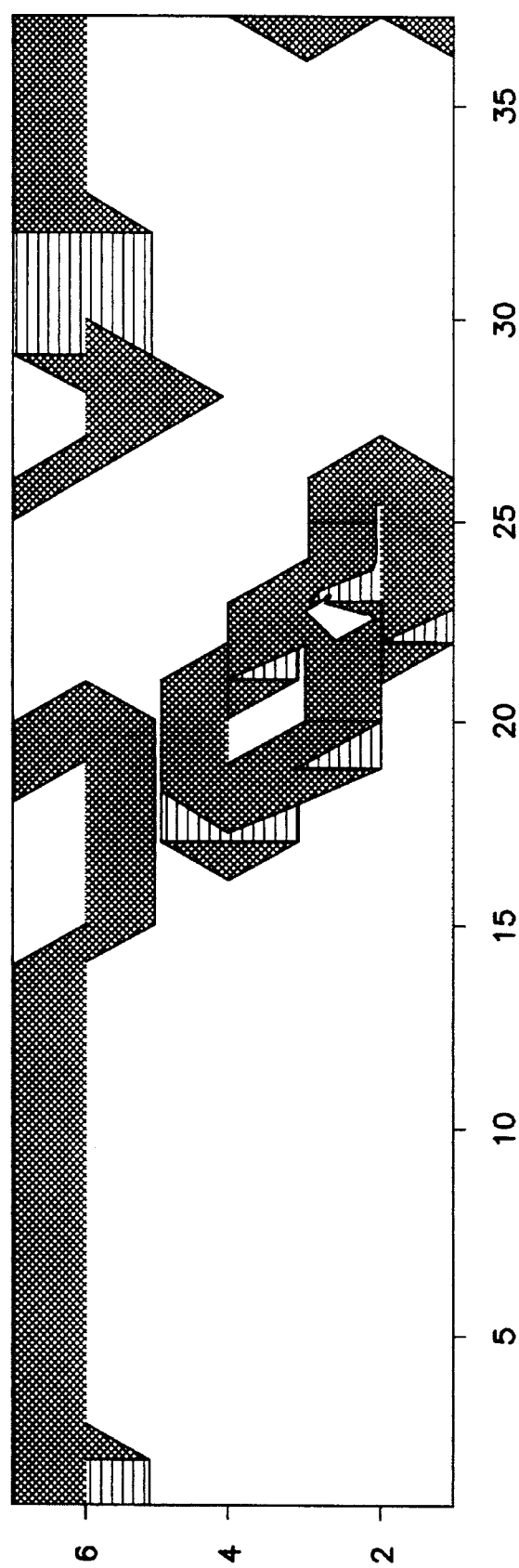
FIG. 6C is a chart showing the sound map of the test template for the word "six" in accordance with FIG. 6B.

In FIG. 6C, the quantized energy vectors $EQ_i$ are accumulated in adjoining blocks to form a template or sound map of the word "six". One could see visually the larger number of speech information contained therein as compared with the transient response for the same word in FIG. 6B. On the y-axis of FIG. 6C, are the seven coefficients of each of the quantized energy vectors $EQ_i$. In addition, the zero crossing rate is also included along the the y-axis, thus the axis has values ranging from 1 to 8. Along the x-axis, the number of adjoining blocks are labelled.

Referring again to FIG. 2, the template matching step 60 receives three inputs: the test templates from the speech map 55, the reference templates from the dictionary 65 and the transient response information from the transient producing step 50, respectively. Among these three categories of information, the transient response is the simplest but it reveals salient features about the unknown speech template and that of the the reference template without burdening the computer memory storage. As will be shown further below, the transient response of the templates allows the system to align the test template and reference template without having to time wrap the time axis of the respective templates. As such, automatic speech recognition systems using the present invention can eliminate quickly as many reference templates as possible before it has to compare the data intensive sound maps. Because the template matching step 60 calls for simple comparison and addition operations, it is possible to implement automatic speech recognition on personal computers and in real time.

Figure 7A:
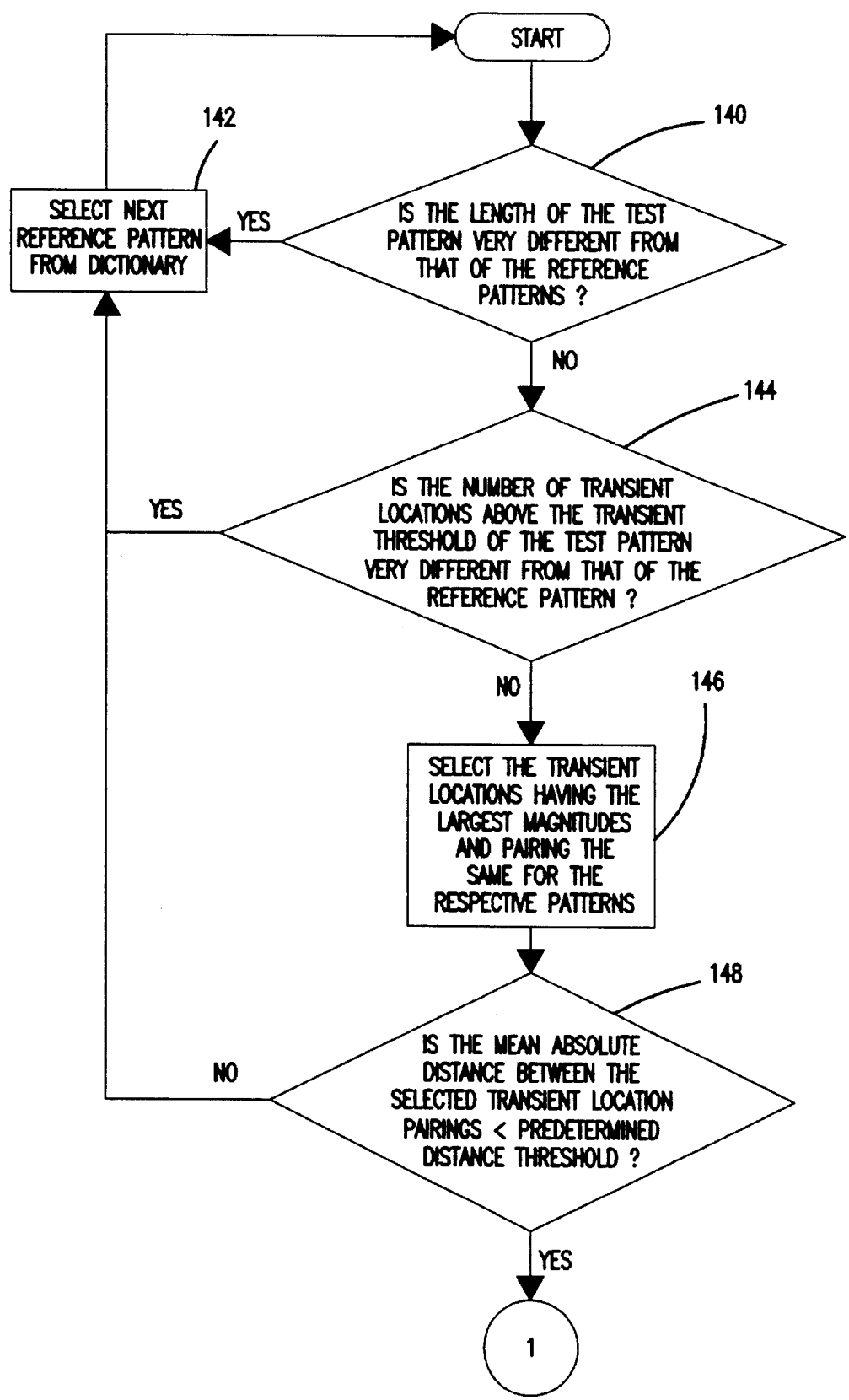
FIGS. 7A & 7B are flowcharts illustrating the template matching method of the present invention.
Figure 7B:
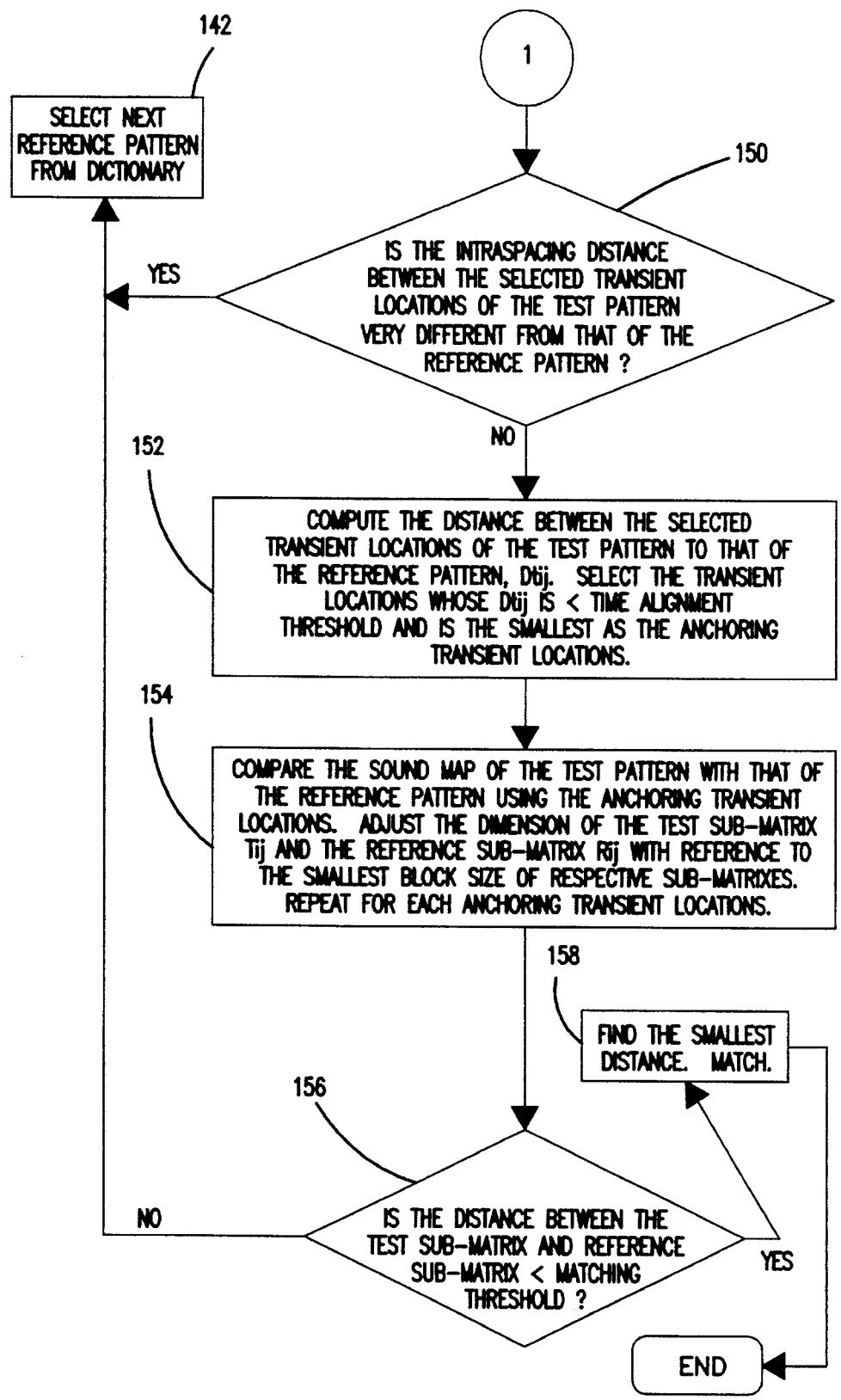
Figure 8A:
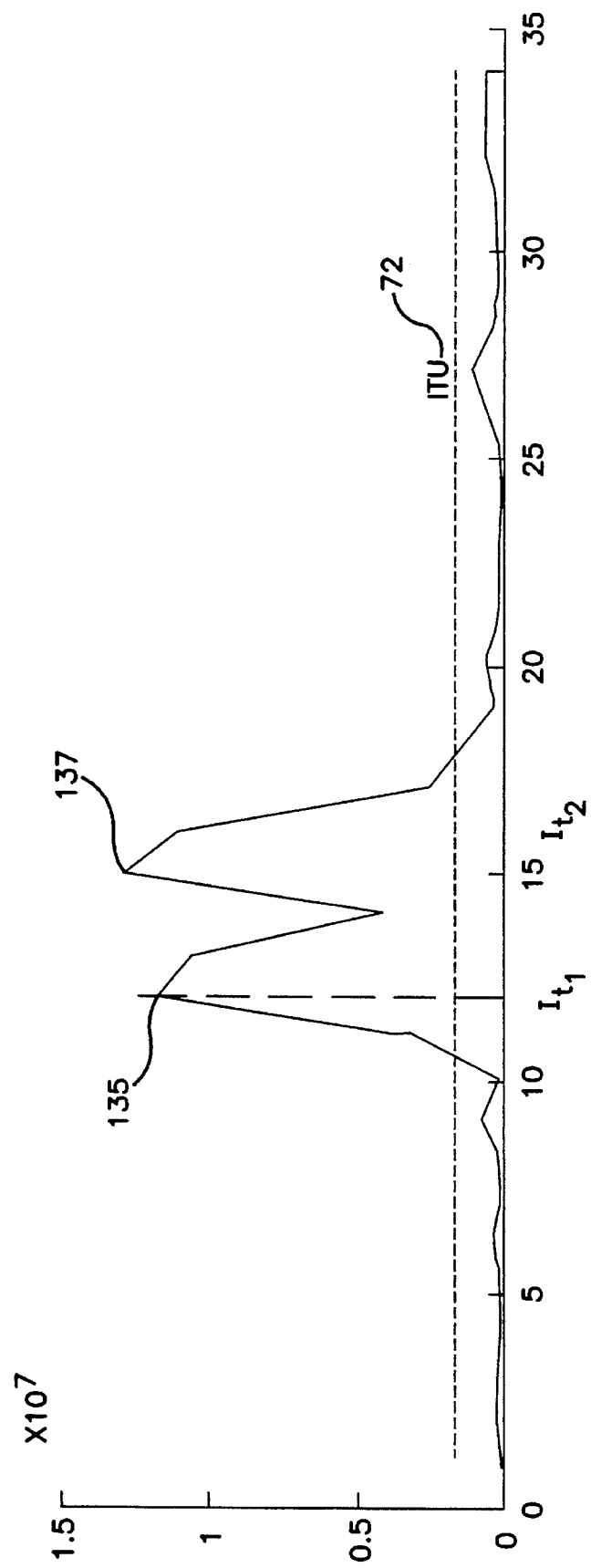
FIG. 8A is chart showing the transient response of a reference template for the word "six" used in the preferred embodiment of the present invention.
Figure 8B:
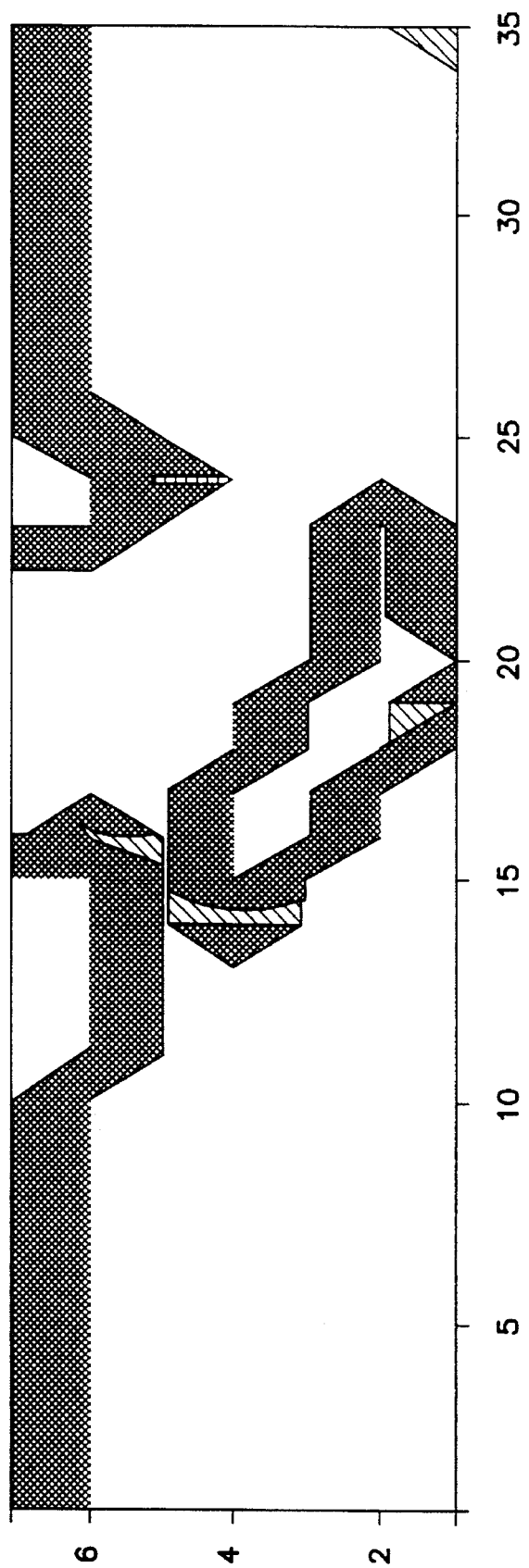
FIG. 8B is chart showing the sound map of the reference template for the word "six" in accordance with FIG. 8A.

FIGS. 7A and 7B are flowcharts detailing the template matching procedure of the present invention. For clarity and consistency, the operation of the template matching step 60 shall be illustrated below with reference to speech templates for the word "six". A test template for the word "six" is illustrated in FIGS. 6B & 6C where the transient response and sound map for an unknown "six" are shown respectively. At the same time, a reference template of the word "six" is shown in FIGS. 8A & 8B where the transient response and sound map for a known "six" are illustrated respectively.

in FIG. 7A, the template matching step 60 begins by comparing the length M of the test template and reference template in step 140. By length, the present invention refers to the number of blocks a particular template spans. In FIG. 6B, the length of test template $M_t$ is 37 blocks long, while the length of the reference template $M_r$ is 34 blocks long in FIG. 8A. The preferred embodiment of the present invention employs a length threshold LT to screen obviously dissimilar templates. The step 140 uses the following criterion:

$$\text{Is } |M_t - M_r|/\text{Max}(M_t, M_r) < TL? \tag{7}$$

where $\text{Max}(M_t, M_r)$ is the bigger of $M_t$ and $M_r$. TL is set at 40%.

It should be understood by one skilled in the art that the length threshold LT can vary depending on the performance requirements one desires. According to (7) if the ratio is less than 40%, that means that the test template is different from the reference template under consideration. Hence, the template matching step 60 proceeds to step 142 to try to match another reference template from the dictionary 65.

If the length of the test template is similar to that of the reference template, the template matching step 60 proceeds to determine the number of transient locations which exceed the transient threshold in step 144. By transient threshold, step 144 refers to the upper threshold ITU in FIGS. 6B or 8A. It should be understood by one skilled in the art that the upper threshold is derived as $I_1=0.03(IMX-IMN)+IMN$, where IMX is the peak energy and IMN the silence energy. Note that this is identical to equation (3) above. With reference to the test template in FIG, 6B and the reference template in FIG. 8A, the number of transient that meets the threshold are 3 and 2 respectively. In the preferred embodiment of the present invention, if the difference in the number of transient response is more than one, then template matching step 60 rejects the reference template under consideration. It then ask for the next reference template from dictionary 65 to be compared in step 142. Of course, one skilled in the art may relax the constraint should the performance requirements call for it.

Next, the template matching step 60 selects the transient locations having the largest magnitude in step 146. By transient location, the present invention refers to the block on the x-axis which corresponds to the peak under consideration—in the case, the peaks with the largest magnitudes. Once again, referring to the test template in FIG. 6B and reference template in FIG. 8A, the eligible transient locations are $T_t=[16\ 19\ 30]$ and $T_r=[12\ 15]$ respectively. In step 146 only two pairs of transient locations are considered for the next step as the reference template has only two transient locations meeting the criterion established therein. It should be understood by one skilled in the art that step 146 eliminates from consideration templates which has vastly different number of transient locations, i.e., the word "six" has between 2 to 3 transient responses, while the word "computer" has between 6 to 7 transient responses.

If the test and reference templates passes the test in step 146, they are further considered in step 148 by examining the mean absolute distance between the selected transient location pairings. The means absolute distance is defined as follows:

$$D_a = 1/M^* \Sigma |T_t' - T_r| \tag{8}$$

where $T_t'$ is the $T_t$ after it has been tested in step 146.

The means absolute distance $D_a$ for the test and reference templates under review is $D_a = \frac{1}{2}|(16-12)+(19-15)|=4$. In the preferred embodiment of the present invention, a distance threshold $D_d$ is set between 2 and 8 blocks to eliminate templates whose transient locations are too far apart. The rationale for establishing $D_d$ as such is because the speech rate variation can be as high as 6 blocks for sampling rate of 11 Khz. Of course, one skilled in the art may adjust $D_d$ as the application calls for. In the instance case, the mean absolute distance is less than that of the threshold. Otherwise, the template matching step 60 proceeds to step 142 where the present reference template is rejected and the next reference template is requested for matching with the test template.

In FIG. 7B the template matching step 60 continues to match the test template in step 150 by comparing the intraspacing distance $I_{tr}$ between the selected transient locations of the templates from step 148. Intraspacing distance is defined as the distance between one transient location and the next one of the same template. Thus the intraspacing distance for the test template $I_{st}=(19-16)=3$ and for the reference template $I_{sr}=(15-12)=3$. In the preferred embodiment of the present invention, another criterion intraspacing threshold $I_d$ is established for determining the probability of matching the test template and reference template. Here, $I_d$ is defined as the distance between $I_{st}$ and $I_{sr}$. In this case, it is zero as they are identical to each other. In the present invention, the intraspacing threshold is set between 2 and 8 blocks. Clearly, the test and reference template under review passes this threshold. In the event they don't, the next reference template will be requested for matching.

Referring again to FIG. 7B, step 152 computes the distance between the transient locations of the test template and that of the reference template $D_{tij}$, and compares them with a time alignment threshold $T_{ta}$. With respect to the test template under consideration, $D_{t11}=(16-12)=4$ and $D_{t12}=(16-15)=1$ for the first transient location at 16 blocks. The other transient location at 19 blocks has $D_{t21}=(19-12)=7$ and $D_{t22}=(19-15)=4$. In step 152, the time alignment threshold $T_{ta}$ is set at 5. If the distance $D_{t11}$ to $D_{t21}$ are within $T_{ta}$, then they will be used as the anchoring transient locations to time align the sound maps of the test and reference templates. Since $T_{ta}$ is set at 5 and $D_{t21}$ is more than $T_{ta}$, 16 is designated as the anchoring transient location for the test template and 12 is for the reference template.

Once the anchoring transient locations are determined in step 152 for the test and reference templates, the present invention compares the similarity of the sound maps of the test and reference templates in step 154. Referring to FIG. 6C and FIG. 8B, the sound maps of the test and reference templates are matrixes of dimension 8×37 and 8×34 respectively. The sound maps are then divided using the anchoring transient locations determined in step 152. It follows that the sound map of the test template can be divided into two sub-matrixes $T_{11}=8×16$ and $T_{12}=8×21$ respectively with 16 at the anchoring transient location. Similarly, the sound map of the reference template is can viewed as two sub-matrixes $R_{11}=8×12$ and $R_{12}=8×22$ with 16 as the anchoring transient location. It should be understood by one skilled in the art that the sub-matrixes are described as rows and columns; the rows corresponds to the coefficients derived from the wavelet transforming means 35 and the columns represent time in units of blocks. To prepare the sub-matrixes for the step in 156 where the distance between the sub-matrixes are calculated, the columns in both directions of the anchoring transient locations are adjusted for the smaller of the two original lengths of the sub-matrixes. By way of example, $T_{11}$ has 16 columns and $R_{11}$ 12 columns originally. In step 154, $T_{11}'$ and $R_{11}'$ will both have 12 columns. By the same token, $T_{12}'$ and $R_{12}'$ will both have 21 instead of 22 columns. T' and R' refer to sub-matrixes that have been adjusted for their dimension such that they are equal to that of each others.

Finally in FIG. 7B, the absolute, Euclidian or Cosine distance between the sub-matrixes T' and R' is computed in step 156. A matching threshold $T_m$ is established between 6 and 8 for determining if there is a match of the test template and the reference template. It should be understood by one skilled in the art that matching threshold $T_m$ may vary depending on the noise level of the input speech template. It is set at 6 for the threshold for comparing the Euclidian distance between the sub-matrixes T' and R'. If the distance between the sub-matrixes are larger than the matching threshold, then there is no match and the next reference template is examined. Otherwise, the minimum distance between the sub-matrixes will be compared. The one with the smallest value signals a matching of templates in step 158.

While the present invention has been described particularly with reference to FIGS. 1 to 8B with emphasis on a method to recognize speech automatically in a computer environment, it should be understood that the figures are for illustration only and should not be taken a limitation on the invention. In addition, it is clear that the method and apparatus of the present invention has utility in many applications where automatic speech recognition is required. It is contemplated that many changes and modifications may be made by one of ordinary skill in the art without departing from the spirit and the scope of the invention as described.

What is claimed is:

1. A method for determining automatically whether an input speech templates matches any of the plurality of reference speech templates, said reference speech templates being stored in a dictionary, said method comprising the steps of:

converting input speech with an analogue-to-digital conversion means, the output of said analogue-to-digital conversion means being a plurality of templates, said templates being digital representation of said input speech;

determining with an endpoint detection means coupled to said analogue-to-digital conversion means for receiving digitized signals therefrom where the speech starts, the location of said speech template commencing and ending at at least two end-points;

estimating superior end-points of said speech signals with a zero crossing means coupled to said analogue-to-digital conversion means and said end point detection means for receiving digitized signals therefrom;

decomposing said speech signals into a plurality of vectors with a wavelet transforming means coupled to said end point detection means for receiving truncated speech signals therefrom, said vectors representing the time, scale and frequency domains of said truncated speech signals;

averaging the plurality of vectors with an energy vector forming means coupled to said wavelet transforming means, said energy vector forming means producing a plurality of energy vectors;

economizing the storage of energy vectors with a quantizing means coupled to said energy forming means by quantizing said energy vectors with reference to a threshold parameter, said energy vectors being converted into two bits for representing each vector for each block;

determining a plurality of transient response of said energy vectors with a transient producing means coupled to said energy vector producing means for obviating the need for time aligning the speech and reference templates, said transient response being the difference in the amplitude of an energy vector of a block and that of the adjoining block;

forming a speech map of said speech templates with a speech map forming means coupled to said quantizing means, said speech templates being accumulative of energy vectors in block by block manner; and comparing the speech map of said input speech templates and that of the reference speech templates from said dictionary with a template matching means coupled to said speech map forming means without searching through the entire contents of the dictionary, said template matching means being further coupled to said transient forming means and said dictionary for receiving therefrom transient response of said blocks and reference speech templates respectively.

2. A method according to claim 1 wherein the step of forming speech map of said dictionary includes adding energy vectors in block by block manner.

3. A method according to claim 1 wherein the step of decomposing said speech signal into a plurality of vectors comprises decomposing said truncated speech signals with a fine filter and a coarse filter at each level, said fine and coarse filters further decompose said truncated speech signal for at least seven levels, said seven levels meeting a minimum redundancy requirement.

4. A method according to claim 1 wherein the step of economizing the storage of energy vectors has a value for the threshold parameter the mean average of a sum of the energy amplitudes of that block.

5. A method according to claim 1 wherein the step of economizing the storage of energy vectors has a binary bit for each bit to represent each vector of each block.

6. A method according to claim 1 wherein the step of comparing the speech map of said input speech templates and that of the reference speech templates from said dictionary aligns the speech map of said input speech and that of the dictionary by determining the distance between the transient response of said input speech and that of the dictionary in accordance with a predetermined distance threshold, the distance being the mean absolute distance between selected transient pairings, said template matching means further by-passes the matching of the speech maps should the distance between the transient response exceeds said threshold.

7. An apparatus for determining automatically whether an input speech templates matches any of the plurality of reference speech templates, said reference speech templates being stored in a dictionary, said apparatus comprising:

an analogue-to-digital conversion means for converting input speech into a plurality of templates, said templates being digital representation of said input speech;

an endpoint detection means coupled to said analogue-to-digital conversion means for receiving digitized signals therefrom and for determining where the speech starts, the location of said speech template commencing and ending at at least two end-points;

a zero crossing means coupled to said analogue-to-digital conversion means and said end point detection means for receiving digitized signals therefrom and for estimating superior end-points of said speech signals;

a wavelet transforming means coupled to said end point detection means for receiving truncated speech signals therefrom and for decomposing said speech signals into a plurality of vectors, said vectors representing the time, scale and frequency domains one said truncated speech signals;

an energy vector forming means coupled to said wavelet transform means for receiving therefrom signals representing vectors in the time, scale and frequency domains and for averaging the plurality of vectors, said energy vector forming means producing a plurality of energy vectors;

a quantizing means coupled to said energy forming means for receiving therefrom said energy vectors and for economizing the storage of energy vectors by quantizing said energy vectors with reference to a threshold parameter, said energy vectors being converted into two bits for representing each vector for each block;

a transient producing means coupled to said energy vector producing means for receiving energy vectors therefrom and for determining a plurality of transient response of said energy vectors, said transient response obviating the need for time aligning the speech and reference templates, said transient response being the difference in the amplitude of an energy vector of a block and that of the adjoining block;

a speech map forming means coupled to said quantizing means for receiving signal representing energy vectors and for forming a speech map of said speech templates, said speech templates being accumulative of energy vectors in block by block manner; and a template matching means coupled to said speech map forming means for receiving therefrom speech map information, said template matching means being further coupled to said transient forming means and said dictionary for receiving therefrom transient response of said blocks and reference speech templates respectively, said template matching means comparing the speech map of said input speech templates and that of the reference speech templates from said dictionary without searching through the entire contents of the dictionary.

* * * * *

UNITED STATES PATENT AND TRADEMARK OFFICE
CERTIFICATE OF CORRECTION

PATENT NO. : 5,528,725

DATED : June 18, 1996

INVENTOR(S) : Hui

It is certified that error appears in the above-identified patent and that said Letters Patent is hereby corrected as shown below:

Title page, item
[30], Foreign Data "9223791" should read --9223791.6--

Col. 6, line 49 "Is" should read --is--

Col. 8, line 33 "$^{EM}i=(D1$" shoul read --$^{EM}i=(D_1$--

Col. 8, line 37 "ith" should read --i th--
Col. 8, line 38 "ith" should read --i th--.

Col. 8, line 62 delete "," after the letter "a"

Col. 9, line 10 "Invention" should read --invention--

Col. 9, line 28 delete "the" after the word "of"

Signed and Sealed this

Seventeenth Day of December, 1996

Attest:

BRUCE LEHMAN

*Attesting Officer*  Commissioner of Patents and Trademarks